(12) United States Patent
Kukreja (10) Patent No.: US 10,212,159 B2
(45) Date of Patent: *Feb. 19, 2019

(54) PHARMACY AUTHENTICATION METHODS AND SYSTEMS

(71) Applicant: CVS Pharmacy, Inc., Woonsocket, RI (US)

(72) Inventor: Vijay Kukreja, Cumberland, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,668

(22) Filed: Dec. 5, 2017

(65) Prior Publication Data

US 2018/0097805 A1    Apr. 5, 2018

Related U.S. Application Data

(63) Continuation of application No. 14/870,976, filed on Sep. 30, 2015, now Pat. No. 9,853,972.

(51) Int. Cl.
| | |
|---|---|
| *G06F 21/33* | (2013.01) |
| *H04L 29/06* | (2006.01) |
| *G06F 21/62* | (2013.01) |
| *G06F 21/41* | (2013.01) |

(52) U.S. Cl.
CPC .......... *H04L 63/0861* (2013.01); *G06F 21/33* (2013.01); *G06F 21/41* (2013.01); *G06F 21/6245* (2013.01); *H04L 63/104* (2013.01); *G06F 2221/2137* (2013.01)

(58) Field of Classification Search
CPC .................................................. H04L 63/0861
See application file for complete search history.

(56) References Cited

U.S. PATENT DOCUMENTS

| | | | |
|---|---|---|---|
| 6,854,642 B2 | 2/2005 | Metcalf et al. | |
| 7,478,067 B2 | 1/2009 | Messina | |
| 7,516,886 B2 | 4/2009 | Gangi | |
| 7,983,452 B2 | 7/2011 | Chaney et al. | |
| 8,380,636 B2 | 2/2013 | Smith, III | |
| 8,406,480 B2 * | 3/2013 | Grigsby | G06K 9/00 340/5.21 |
| 8,694,332 B2 | 4/2014 | Martin et al. | |
| 8,768,838 B1 | 7/2014 | Hoffman | |
| 9,043,012 B2 | 5/2015 | Davey et al. | |
| 9,495,586 B1 * | 11/2016 | Hagen | G06K 9/00288 |
| 2001/0047281 A1 * | 11/2001 | Keresman, III | G06F 21/6245 705/2 |
| 2006/0064326 A1 | 3/2006 | Tucker | |

(Continued)

FOREIGN PATENT DOCUMENTS

| | | | |
|---|---|---|---|
| WO | 2004082359 | | 9/2004 |
| WO | WO2004082359 | * | 9/2004 |

*Primary Examiner* — Kambiz Zand
*Assistant Examiner* — Thanh H Le
(74) *Attorney, Agent, or Firm* — Patent Law Works LLP (57) ABSTRACT

An electronic image that includes information identifying a user of a client device is received, as is another electronic image that captures the face of the user. A first account (e.g., a store account) is linked to a second account (e.g., a pharmacy account) if an image of the user extracted from the first electronic image matches the face of the user.

20 Claims, 6 Drawing Sheets

(56) References Cited

U.S. PATENT DOCUMENTS

2007/0279187 A1* 12/2007 Hekmatpour .......... G06Q 50/22
                                                  340/5.83
2011/0145147 A1    6/2011  Wylie
2014/0165171 A1    6/2014  Meng et al.

* cited by examiner

| User Number | Username | Password | Challenge Q & A |
|---|---|---|---|
| 1 | example1@email.com | password1 | Q1 & A1 |
| 2 | example2@email.com | password2 | Q2 & A2 |
| 3 | example3@email.com | password3 | Q3 & A3 |
| ... | ... | ... | ... |

202 — User Number
204 — Username
206 — Password
208 — Challenge Q & A

| 302 Patient Name | 304 Patient Address | 306 Patient Phone Number | 308 Patient Date of Birth | 310 Prescribing Physician | 312 Insurance Information |
|---|---|---|---|---|---|
| Lastname1, Firstname1 | Address1 | Number1 | DOB1 | Doctor1 | Insurer1 |
| Lastname2, Firstname2 | Address2 | Number2 | DOB2 | Doctor2 | Insurer2 |
| Lastname3, Firstname3 | Address3 | Number3 | DOB3 | Doctor3 | Insurer3 |
| ... | ... | ... | ... | ... | ... |

PHARMACY AUTHENTICATION METHODS AND SYSTEMS

CROSS-REFERENCE TO RELATED APPLICATIONS

This application is a continuation of U.S. application Ser. No. 14/870,976, entitled "Pharmacy Authentication Methods and Systems," filed Sep. 30, 2015, the entirety of which is herein incorporated by reference.

TECHNICAL FIELD

Embodiments of the present invention related generally to user authentication and, more particularly, to systems and methods for authenticating a user of a first user account to a second user account.

BACKGROUND

When pharmacies fill prescriptions for patients, a pharmacist, technician, or other pharmacy worker typically collects information from the patient—such as, for example, the patient's name, address, date of birth, prescribing physician, and/or insurance information—and stores this information in a pharmacy account in a repository or database. The pharmacy may retain this information for subsequent visits by the patient to the pharmacy to thereby preclude the need to re-enter some or all of it. If the pharmacy has multiple locations, the collected information may be shared between them electronically so that, if the patient goes to a different pharmacy, some or all of the information is still available.

The patient may not be able, however, to later access the collected information without physically travelling to a pharmacy. The patient may wish to edit or update the information, for example, or access other information, such as a status of a recently placed pharmacy order. In order to enable remote access (via, for example, a client computer connected to the Internet), the patient would need to present authentication information (such as a username and password) that is not part of the information collected at the pharmacy. This information might have been collected when the patient placed the pharmacy order, but doing so is inconvenient, deterring, and/or time-consuming for the patient. The patient may have already possess an online account with a store associated with the pharmacy, but without additional authentication, there is no way to link the store account with the pharmacy account with accuracy or certainty. A need therefor exists for a more convenient and simpler way for patients to authenticate to and access pharmacy account information.

SUMMARY

Embodiments of the present invention include systems and methods for authenticating a user of a store account to a pharmacy account associated with the user. In various embodiments, a user is logged into (i.e., authenticated to) and/or creates a store account via a mobile device or other client device. In some embodiments, creation of the store account is facilitated by the scanning of a bar code on an identification card, such as a driver's license, passport, or similar card, to thereby autofill such fields as the user's name, date of birth, etc. The user captures an image, using the client device, of identification information of the user, such as a driver's license, government-issued identification card, passport, or other identification card that includes an image of the user's face. The user also captures an image, using the client device, of his or her face. The images (and/or information extracted from the images) are transmitted to a server; the server may verify the validity of any identification documents in the image. The server then compares the photo of the face of the user from the identification card to the just-taken photo of the user; if they match, the server associates the pharmacy account with the store account, allowing the user to access information in the pharmacy account.

In one aspect, a method for authenticating a user of a first account to a second account includes receiving, from a client device of the user, authentication information related to the first account; authenticating the user to the first account using the authentication information; receiving, from the client device of the user, a first electronic image comprising a photo ID belonging to the user and a second electronic image comprising the face of the user; electronically comparing, using a computer processor, the photo ID to the face of the user; and linking the first account to the second account if the photo ID matches the face of the user.

Authenticating the user to the first account may include accessing an existing account or creating a new account; creating a new account may include extracting information about the user from a bar code printed on the photo ID (e.g., a name, address, or date of birth of the user). A pharmacy number, order number, or prescription number may be received from the client device and the pharmacy number, order number, or prescription number may be compared to a number associated with the user. The pharmacy number, order number, or prescription number may be extracted from a third electronic image comprising a prescription label. The photo ID may include a driver's license, government-issued identification card, or passport. The authenticity of the photo ID may be verified by, for example, comparing the photo ID to a database of known good images of identification documents and/or querying a database of known good identification numbers to an identification number displayed on the photo ID. The identification number may include a driver's license number, social-security number, or passport number. The first account may include a store account and the second account may include a pharmacy account.

In another aspect, a system for authenticating a user of a first account to a second account includes a network interface configured for communication with a client device of the user; a non-volatile computer memory for storing information associated with the first account and information associated with the second account; and a computer processor configured for executing software instructions to receive, from a client device of the user, authentication information related to the first account; authenticate the user to the first account using the authentication information; receive, from the client device of the user, a first electronic image comprising a photo ID belonging to the user and a second electronic image comprising the face of the user; electronically compare, using a computer processor, the photo ID to the face of the user; and link the first account to the second account if the photo ID matches the face of the user.

Authenticating the user to the first account may include accessing an existing account or creating a new account; creating a new account may include extracting information about the user from a bar code printed on the photo ID (e.g., a name, address, or date of birth of the user). A pharmacy number, order number, or prescription number may be received from the client device and the pharmacy number, order number, or prescription number may be compared to a number associated with the user. The pharmacy number, order number, or prescription number may be extracted from a third electronic image comprising a prescription label. The photo ID may include a driver's license, government-issued identification card, or passport. The authenticity of the photo ID may be verified by, for example, comparing the photo ID to a database of known good images of identification documents and/or querying a database of known good identification numbers to an identification number displayed on the photo ID. The identification number may include a driver's license number, social-security number, or passport number. The first account may include a store account and the second account may include a pharmacy account.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Various embodiments of the present invention include systems and methods for authenticating a user authenticated to a first user account to a second user account using captured identification information associated with the user and a captured image of the user's face. In various embodiments, with reference to FIG. 1, a computing environment 100 includes a client device 102 connected to a network 104 (such as the Internet) via a wired or wireless link. The client device 102 may be a mobile phone, smartphone, tablet computer, laptop computer, desktop computer, or similar device; in other embodiments, the client device 102 may be a point-of-sale system. The client device 102 includes or is connected to, via a network connection 106, an image-capture device 108, which may be an integrated smartphone camera, digital camera, scanner, or similar device. A store server 110 may also be connected to the network 104; the store server 110 may further be connected to or include a store account database 112 via a network or local connection 114. The computing environment may further include a pharmacy server 116, which may be connected to or include a pharmacy account database 118 via a network or local connection 120. The pharmacy server 116 may be in communication with the client device 102 and/or store server 110 via the network 104; in other embodiments, the pharmacy server 116 is in communication with the store server 110 via a separate, private network.

Figure 1:
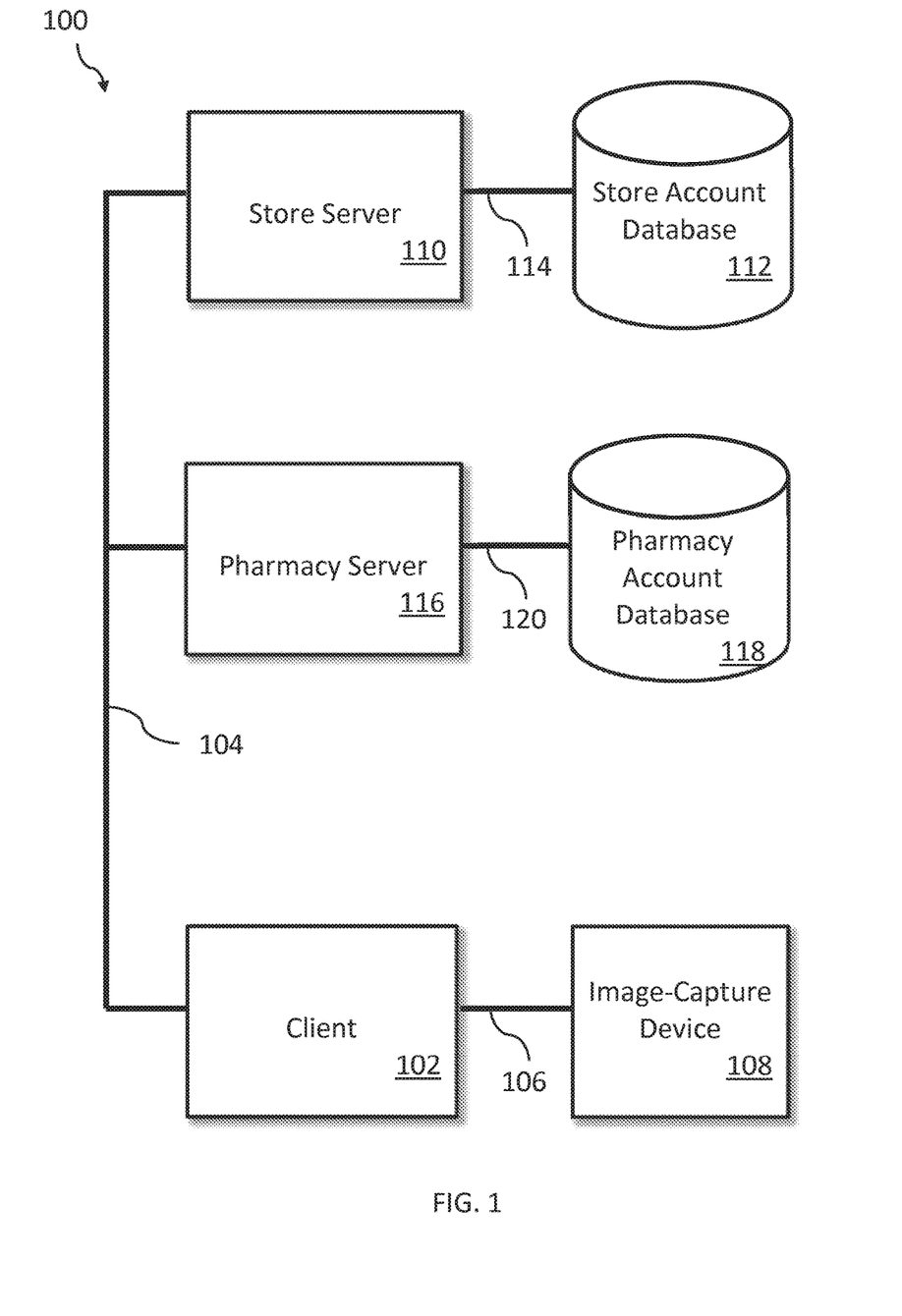
FIG. 1 illustrates a system for authenticating a user of a first user account to a second user account in accordance with an embodiment of the present invention.

One of skill in the art will understand that the disclosed embodiments of the present invention are not limited to only the configuration of the environment 100, however, and that other configurations of the servers 110, 116 and client device 102 are within the scope of the present invention. For example, any number of servers 110, 116 and clients 102 may be used; in some embodiments, some or all of the functionality of the servers 110, 116 may be implemented on a single server 110, 116 and/or on the client 102.

Figure 2:
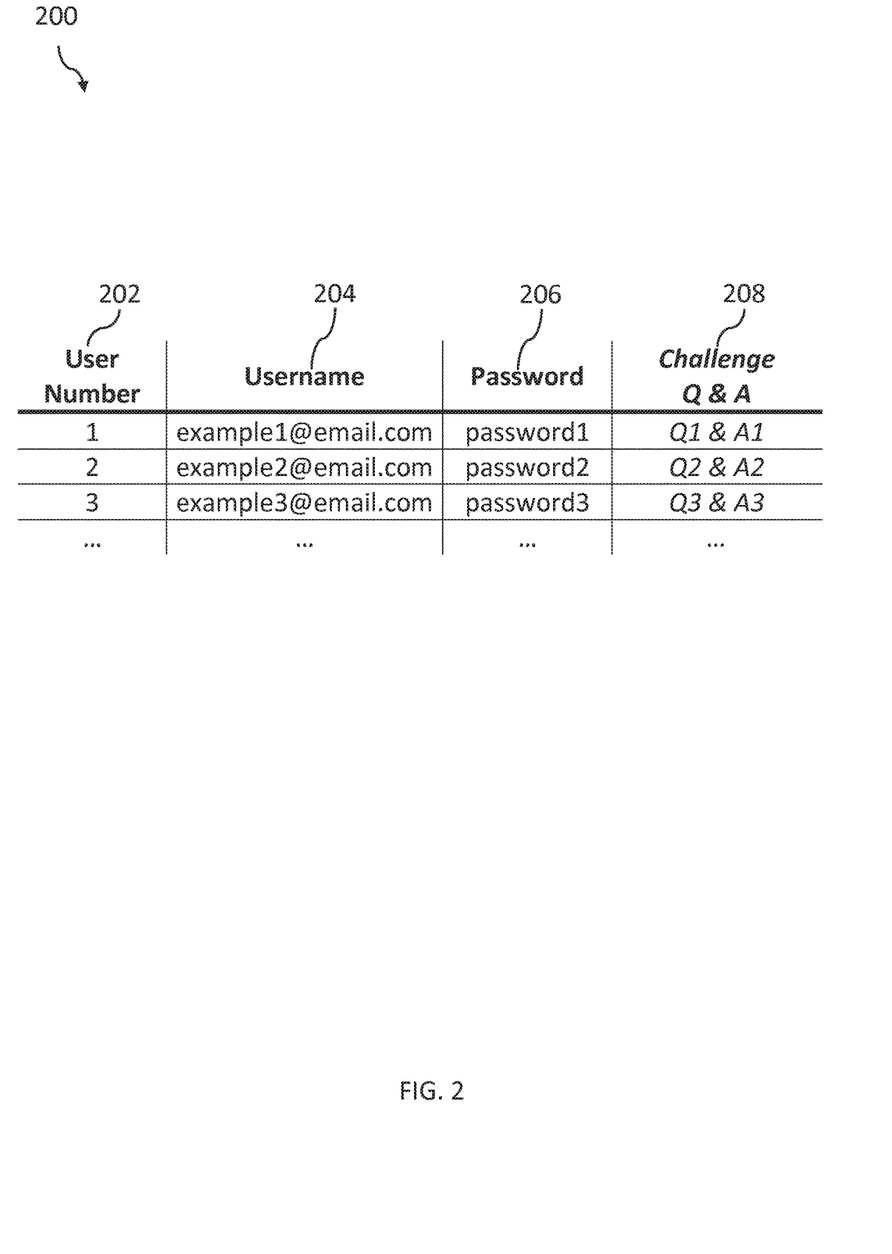
FIG. 2 illustrates an exemplary first user-account database in accordance with an embodiment of the present invention.

FIG. 2 illustrates a plurality of exemplary entries 200 in the store account database 112; the present invention, however, is not limited to any particular type, format, or arrangement of entries. The entries 200 may include, for each store account, a user number 202, a username 204 (which may be an email address of the user or any other username), and a password 206 (which may be stored using encryption, salting, or any other type of password protection system). In some embodiments, the entries 200 further include a pre-selected challenge question and answer 208. Any other type of user information, as mentioned above, may be associated with each entry 200. In some embodiments, the user's store account includes further user information, such as the user's name, address, phone number, email address (if different from the username), payment information (such as credit-card information), shopping cart, wishlist, order history, coupons, gift certificates, or any other similar information. Entries 200 in the store account database 112 may be pre-existing or may be created before, during, or after the linking of the store account to the pharmacy account, as described herein.

Figure 3:
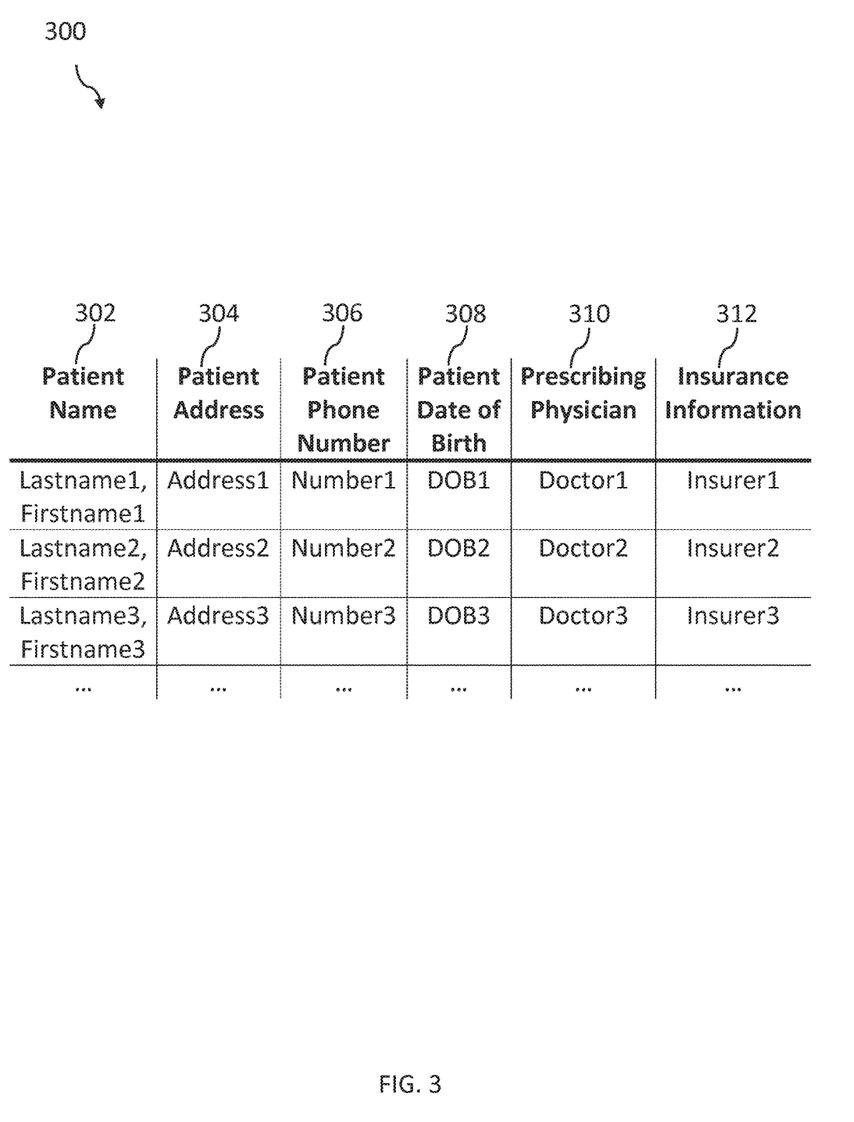
FIG. 3 illustrates an exemplary second user-account database in accordance with an embodiment of the present invention.

FIG. 3 illustrates a plurality of exemplary entries 300 in the pharmacy account database 118; the present invention, however, is not limited to any particular type, format, or arrangement of entries. The entries 300 may include, for each pharmacy account, a patient name 302, a patient address 304, a patient phone number 306, a patient date of birth 308, a prescribing physician 310, and/or insurance information 312. Any other type of patient information may be associated with each entry 300.

Figure 4:
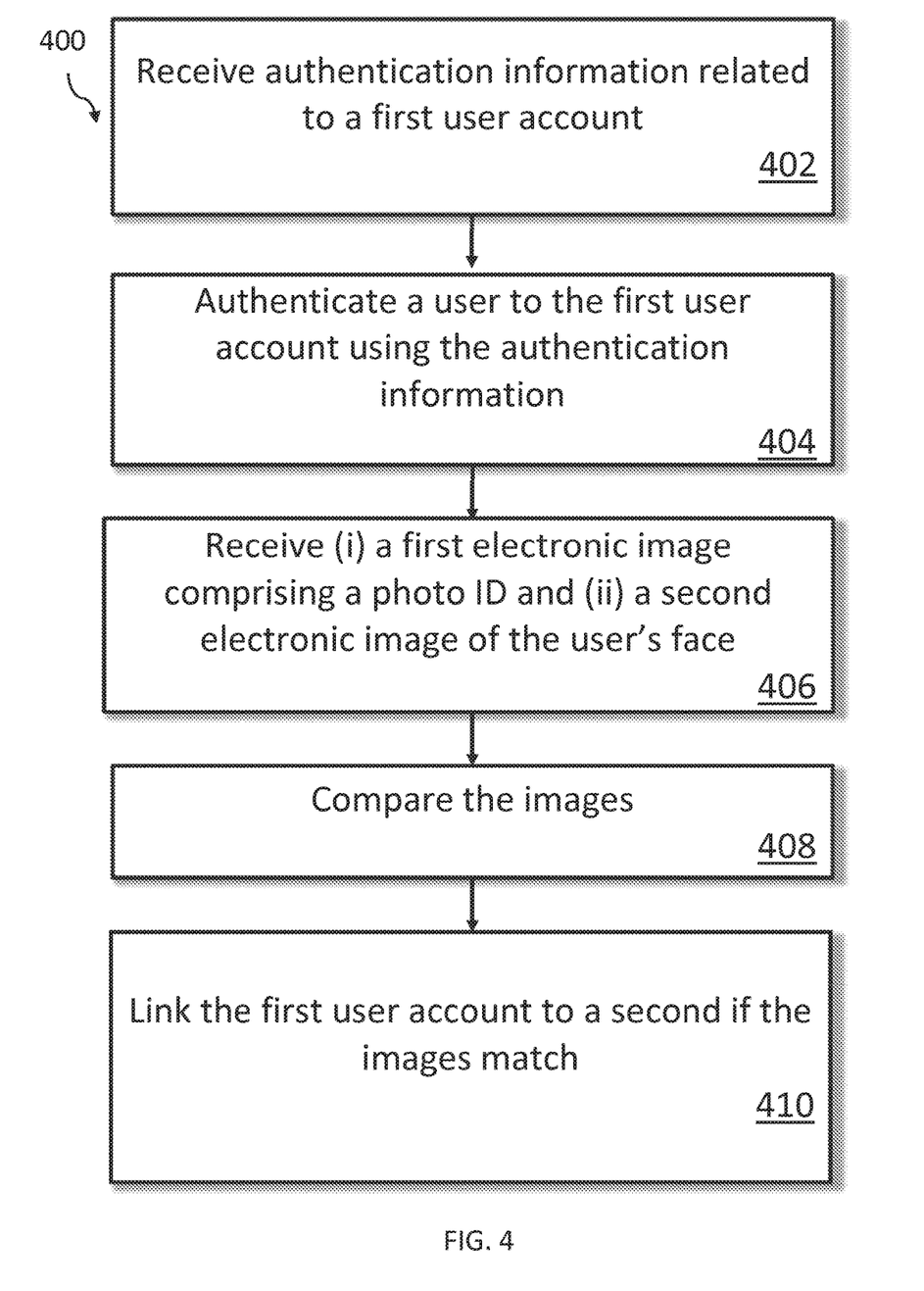
FIG. 4 illustrates a method for authenticating a user of a first user account to a second user account in accordance with an embodiment of the present invention.

FIG. 4 illustrates a method 400 for authenticating a user of a first user account (e.g., a store account) to a second user account (e.g., a pharmacy account). Authentication information related to the first user account associated with the user is received (402); the user is authenticated (404) to the first account using the authentication information. This authentication may include accessing an existing account or creating a new account. Two further items are received (406) before or after the information about the first account: a first electronic image that includes a photo ID of the user (e.g., a driver's license) and a second electronic image that includes a picture of the user's face. The images are compared (408), and the first account is linked (410) to the second if the images match. Each of these steps is explained in greater detail below.

In the first step 402, the store server 110 receives authentication information related to the store account via the network 104. In some embodiments, the client device 102 executes a native or thin-client application (e.g., a web browser) that allows the user to log in and access store-server functions, such as online shopping. The user of the client device 102 enters authentication information into the client device 102 via a user-input device in electronic communication with the client 102, such as a keyboard, touchscreen, mouse, microphone, fingerprint reader, biometric scanner, or other such device. The authentication information may include a username, password, voice command or input, fingerprint, heart-rate pattern, or other similar input. In some embodiments, the client device 102 transmits some or all of the authentication information to the store server 110 over the network 104; the authentication information may be encrypted or otherwise protected prior to transmission. The authentication may be received from a user having an existing account or from a user setting up a new account.

In some embodiments, the client application prompts or allows the user to create a store account by capturing an image, using the client device 102, of a bar code displayed on the front or back of an identification card belonging to the user, such as a driver's license or other photo ID. The bar code may be a one-dimensional bar code, two-dimensional bar code, or any other symbol that encodes information as a graphic image. The information encoded in the bar code may include the user's name, address, date of birth, driver's license number, or any other similar information. The information may be extracted from the bar code by the client device 102, the store server 110, or by a third-party server (such as, for example, a commercial or government server that offers bar-code information extraction as a service). The client device 102 may transmit the bar code as an electronic image and/or information extracted therefrom to the store server 110 and/or the third-party server; in some embodiments, the store server 110 receives and transmits the bar code to the third-party server. The information extracted from the bar code may thereafter be displayed on an account-setup screen on the client device as fixed (i.e., uneditable) fields or be displayed in editable fields (i.e., used to populate fields that would otherwise require text input from the user). In other embodiments, the client device 102 instead or in addition prompts the user to capture an image of text appearing on the identification card; the client 102 and/or store server 110 may thereafter extract information from the image of the card or document using, for example, optical-character recognition, edge detection, pattern matching, or any other technique known in the art. This extracted information may be used to verify the information extracted from the bar code.

In the second step 404, the user is authenticated to the first account using the received authentication information. Any system or method of authentication known in the art is within the scope of the present invention. In some embodiments, the received username is used as an index into a database of username/password tuples, and a stored password is retrieved based thereon; the stored password is thereafter compared to the received password. The stored password may be stored in an encoded, encrypted, and/or salted form; the received password may first be similarly encoded, encrypted, and/or salted before the comparison. If the user is setting up a new account, the received password is stored in the database as the new stored password. In other embodiments, the user's name, location, phone number, address, or other such information and/or the client device's network address, machine access code, or other such attribute is used in place of or in addition to the username. Similarly, facial recognition, biometric information, fingerprints, or other such information may be used in place of or in addition to the password.

The authentication may be performed by the store server 110 and/or the client 102. For example, the client 102 may transmit a request for the stored password to the store server 110 and receive the stored password back in response; the client 102 may thereafter compare the received password with the stored password. Any division of the authentication process between the client 102 and the store server 110 is within the scope of the present invention.

Once authenticated, the client 102 may retain a key, token, cookie, or similar indication of successful authentication in a local memory or other storage; subsequent requests by the user to access the store database 112 may thus not require re-transmission of the authentication information. The user may remain authenticated to the client 102 indefinitely, until a certain amount of time (e.g., one day) has elapsed, until the user logs out of an application on the client 102, until the user powers down the client 102, or any similar event or amount of time. In some embodiments, the first two steps 402, 404 are performed immediately prior to the remainder of the steps 406-410, such as when, for example, the user wishes to link the pharmacy account to the store account but is not already authenticated to the store account. In other embodiments, the user has authenticated to the store account prior to the attempt to link the two accounts. In other words, the second step 404 and the third step 406 may be separated in time by any amount of time. In still other embodiments, the first steps 402, 404 are performed during or after the later steps 406-410 if, for example, the user has not yet created a store account—creation of the store account may occur after, for example, the electronic image is received.

In a third step 406, a first electronic image that includes an image of a photo ID belonging to the user, such as a driver's license, is received, as is a second electronic image of a just-captured image of the user's face. A software application executing on the client 102 may guide the user in taking or scanning the images. The client application may prompt the user to capture the images with a user interface that includes visual guides, such as a crosshair, image-boundary rectangle, or other such features. Once captured, the client 102 and/or store server 110 may test the quality of the images by, for example, measuring a light level or blurriness level of the image. If either image is inadequate, the client 102 may prompt the user to capture another image. The client application may prompt the user to capture the images in either order. The client application may be a standalone application for linking and thereafter accessing the pharmacy server 116; in other embodiments, the client application is a store-server access application that includes other features, such as online shopping. The client application may be a client-native application, web-browser application, or any other type of application.

In some embodiments, the client 102 and/or store server 110 verifies that the card or document depicted in the image is authentic. For example, the client 102 and/or store server 110 may compare a layout, shape, watermark, seal, logo, or similar feature of the card or document with a known authentic layout, shape, watermark, seal, or logo stored in the memory of the store server 110. In some embodiments, the store server 110 sends a request to a third-party system, such as a department of motor vehicles server (via, for example, an application-programming interface) for verification using an identification number on the card or document, such as the driver's license number. The third-party server may respond with a message indicating that the card or document is authentic; the message may further or instead include information printed on the document.

At least one other item of authentication information may be received. In some embodiments, the other item includes a pharmacy number, order number, prescription number, or other such information. The client 102 may prompt the user to enter the other item via text input using, for example, a keyboard or touchscreen, via voice input, or via image input. The image input may be an image captured by the client device of a prescription label, such as a label on a pill bottle, other medicine container, pharmacy shopping bag, or any other type of label or sticker. The client 102 may transmit the image and/or information extracted therefrom to the store server 110.

In a fourth step 408, the image of the user's face as depicted on the photo ID is compared to the just-captured image of the user's face. The comparison may be performed by the client 102, store server 110, or any other device. Any system or method for facial comparison is within the scope of the present invention; for example, facial features such as the user's eyes, nose, ears, and/or chin may be identified in each image using edge detection, shape detection, or similar image-processing algorithms, and the absolute or relative sizes of and/or distances between the facial features may be compared.

In a fifth step 410, the store server 110 links the user's store account to the user's pharmacy account if the faces in the photos match. In some embodiments, the store server 110 links the accounts if the facial features identified in the photos match with a threshold degree of certainty, such as a 90% match or 95% match. The threshold may be computed by any means known in the art, such as by averaging a percentage difference of facial-feature size and distance for a variety of facial features and distances therebetween. If the faces match, the store server 110 and/or pharmacy server 116 creates a link between the two accounts, thereby permitting the user to access some or all of the linked entry in the pharmacy account database 118 via the store server 110 if and when the user is authenticated to the store server 110. If the faces do not match, the client 102 may so inform the user and optionally prompt the user to re-capture either or both images.

In some embodiments, the store server 110 may also or instead communicate with the pharmacy server 116 to thereby search the pharmacy account database 118 for the user's pharmacy account; in some embodiments, this search is performed if the facial matching fails or falls below the threshold, if the user opts to forego the facial matching, and/or to verify the facial matching. For example, the store server 110 and/or pharmacy server 116 may search the entries in the pharmacy account database 118 for an entry that matches some or all of the information extracted from the image of the user's identification card or document and/or the additional authentication information. For example, the pharmacy server 116 may query the pharmacy account database 118 with the order number or prescription number and thereby identify an entry associated with either or both numbers; the pharmacy server 116 may thereafter attempt to match the user's name, date of birth, and other information extracted from the card or document with corresponding information in the identified entry in the pharmacy account database 118. If only some of the information matches, the store server 110 and/or pharmacy server 116 may send a request to the client 102 for further authentication information, such as the user's social-security number; the request may instead or in addition include a request for the user to resolve or explain any discrepancies. The request may further or instead include a prompt for the user to contact a technician via phone, fax, email, or other means to resolve any discrepancies.

Figure 5:
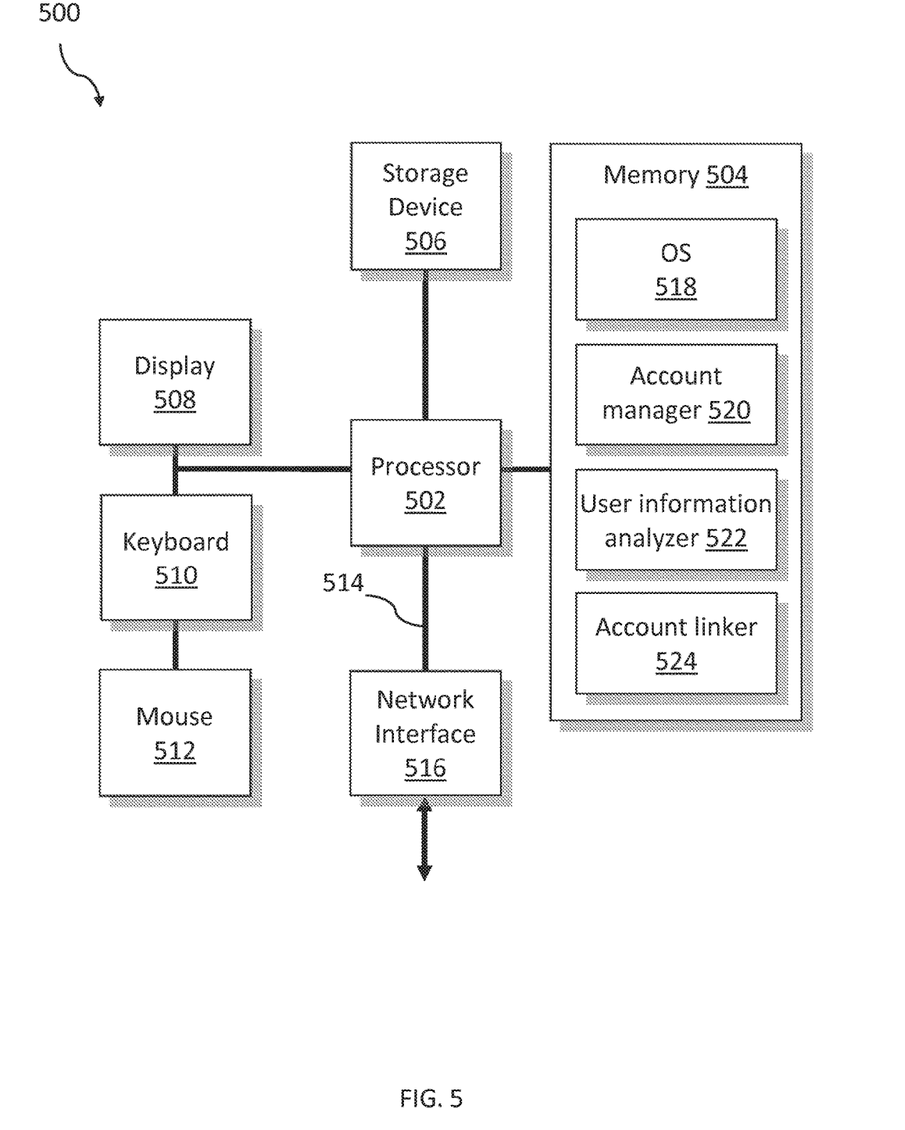
FIG. 5 illustrates an exemplary server computing device in accordance with an embodiment of the present invention.

FIG. 5 is a simplified block diagram of a suitably programmed general-purpose server 500 implementing embodiments of the present invention; the server may be the store server 110, pharmacy server 116, or host part of either or both servers 110, 116. The server 500 includes a processor 502 having one or more central processing units (CPUs), volatile and/or non-volatile main memory 504 (e.g., RAM, ROM, or flash memory), one or more mass storage devices 506 (e.g., hard disks, or removable media such as CDs, DVDs, USB flash drives, etc. and associated media drivers, which may be used for the store account database 112 and/or pharmacy account database 118), a display device 508 (e.g., a liquid-crystal display (LCD) monitor), user-input devices such as a keyboard 510 and a mouse 512, and one or more buses 514 (e.g., a single system bus shared between all components, or separate memory and peripheral buses) that facilitate communication between these components. A network interface 516 (e.g., a Wi-Fi or ETHERNET port) may be used to connect the computer 500 to the Internet or other network.

The main memory 504 may be used to store instructions to be executed by the processor 502, conceptually illustrated as a group of modules. These modules generally include an operating system 518 (e.g., a Microsoft WINDOWS, Linux, or APPLE OS X operating system) that directs the execution of low-level, basic system functions (such as memory allocation, file management, and the operation of mass storage devices), as well as higher-level software applications, such as a store and/or pharmacy account manager 520 (for, e.g., authenticating a user to a store account, creating a new store account, or allowing access to a pharmacy account via a store account), a user information analyzer 522 (for, e.g., extracting information from images), and an account linker 522 (for, e.g., linking a store account to a pharmacy account). The various modules may be programmed in any suitable programming language, including, without limitation high-level languages such as C, C++, Java, Perl, Python, or Ruby or low-level assembly languages. The memory 504 may further store input and/or output data associated with execution of the instructions as well as additional information used by the various software applications.

Figure 6:
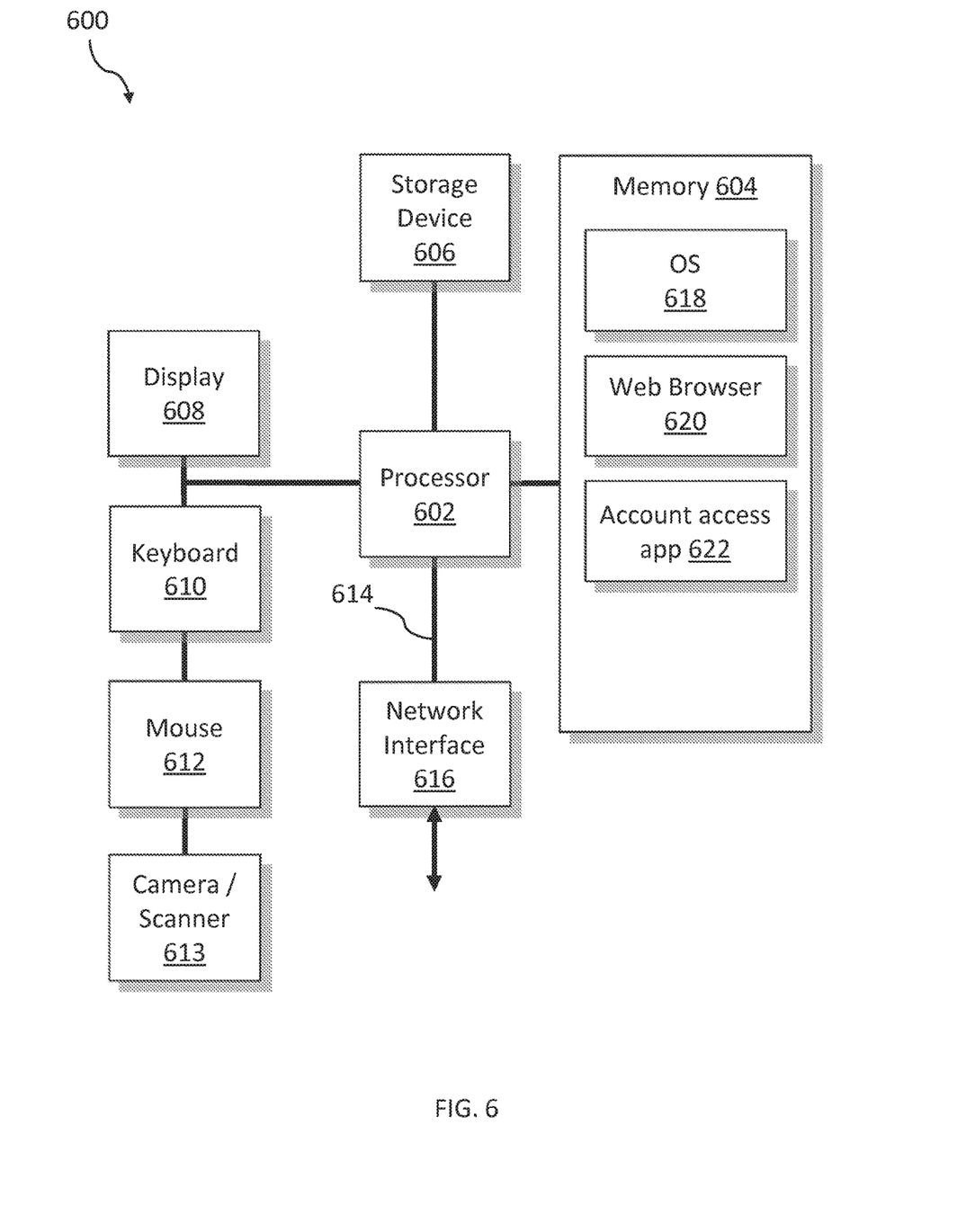
FIG. 6 illustrates an exemplary client computing device in accordance with an embodiment of the present invention.

FIG. 6 is a simplified block diagram of a suitably programmed client device 600 for capturing information from a user and displaying an order status thereto. Like the server 500, the client device 600 includes a processor 602, a memory 604, a storage device 606, a display 608, a keyboard 610, a mouse 612, buses 614, and a network interface 616. The client 600 may further include a camera/scanner 613 for capturing images. The client 600 and the server 500 may communicate via a network such as the Internet using the network interfaces 516, 616. The user input and output interfaces described herein may be presented to the user via a web browser 620 and/or a client-native application 622.

The server 500 and client 600 are described herein with reference to particular blocks, but this description is not intended to limit the invention to a particular physical arrangement of distinct component parts. The computers 500, 600 are illustrative examples; variations and modifications are possible. Computers 500, 600 may be implemented in a variety of form factors, including server systems, desktop systems, laptop systems, tablets, smartphones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, the computer processor may be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A computer implemented method for linking a first account of a user to a second account of the user, the method comprising:
   authenticating the user to the first account;
   receiving, from a client device:
      a first electronic image comprising an image of a photo ID captured by a camera of the client device, the first electronic image comprising an ID image of the face of the user arranged on the photo ID; and
      a second electronic image comprising an image of the face of the user captured by the camera of the client device;
   determining whether the image of the face of the user matches the ID image of the face of the user; and
   generating a link between the first account of the user and the second account of the user responsive to the image of the face of the user matching the ID image of the face of the user.

2. The method of claim 1, wherein authenticating the user to the first account comprises creating a new account.

3. The method of claim 2, wherein creating the new account comprises extracting information about the user from a bar code printed on the photo ID.

4. The method of claim 3, wherein the information about the user comprises a name, address, or date of birth of the user.

5. The method of claim 1, further comprising:
   identifying the second account by:
      receiving a pharmacy number, order number, or prescription number from the client device; and
      comparing the pharmacy number, order number, or prescription number to a number associated with the user.

6. The method of claim 5, further comprising extracting the pharmacy number, order number, or prescription number from a third electronic image comprising a prescription label.

7. The method of claim 1, wherein the photo ID comprises a driver's license, government-issued identification card, or passport.

8. The method of claim 1, further comprising verifying the authenticity of the photo ID.

9. The method of claim 8, wherein verifying the authenticity of the photo ID comprises comparing the photo ID to a database of known good images of identification documents.

10. The method of claim 8, wherein verifying the authenticity of the photo ID comprises querying a database of known good identification numbers to an identification number displayed on the photo ID.

11. The method of claim 10, wherein the identification number comprises a driver's license number, social-security number, or passport number.

12. The method of claim 1, wherein the first account of the user comprises a store account and the second account of the user comprises a pharmacy account.

13. A system for linking a first account of a user to a second account of the user, the system comprising:
   a network interface configured for communication with a client device of the user;
   a non-volatile computer memory for storing information associated with the first account and information associated with the second account; and
   a computer processor configured for executing software instructions to:
      authenticate the user to the first account;
      receive, from a client device:
         a first electronic image comprising an image of a photo ID captured by a camera of the client device, this first electronic image comprising an ID image of the face of the user arranged on the photo ID; and
         a second electronic image comprising an image of the face of the user captured by the camera of the client device;
      determine whether the image of the face of the user matches the ID image of the face of the user; and
      generate a link between the first account of the user and the second account of the user responsive to the image of the image of the face of the user matching the ID image of the face of the user.

14. The system of claim 13, wherein authenticating the user to the first account comprises creating a new account.

15. The system of claim 14, wherein creating the new account comprises extracting information about the user from a bar code printed on the photo ID.

16. The system of claim 15, wherein the information about the user comprises a name, address, or date of birth of the user.

17. The system of claim 13, wherein the computer processor is further configured for executing software instructions to:

receive a pharmacy number, order number, or prescription number from the client device; and compare the pharmacy number, order number, or prescription number to a number associated with the user to identify the second account.

18. The system of claim 17, wherein the computer processor is further configured for executing software instructions to extract the pharmacy number, order number, or prescription number from a third electronic image comprising a prescription label.

19. The system of claim 13, wherein the photo ID comprises a driver's license, government-issued identification card, or passport.

20. The system of claim 13, wherein the first account of the user comprises a store account and the second account of the user comprises a pharmacy account.

* * * * *